US008189149B2

(12) United States Patent
Satake et al.

(10) Patent No.: US 8,189,149 B2
(45) Date of Patent: May 29, 2012

(54) LIQUID CRYSTAL PANEL AND LIQUID CRYSTAL DISPLAY APPARATUS

(75) Inventors: Masayuki Satake, Ibaraki (JP); Yuusuke Toyama, Ibaraki (JP); Naotaka Kinjou, Ibaraki (JP); Takashi Shimizu, Ibaraki (JP); Kentarou Yoshida, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 149 days.

(21) Appl. No.: 12/306,847

(22) PCT Filed: Jun. 8, 2007

(86) PCT No.: PCT/JP2007/061600
§ 371 (c)(1),
(2), (4) Date: Dec. 29, 2008

(87) PCT Pub. No.: WO2008/004403
PCT Pub. Date: Jan. 10, 2008

(65) Prior Publication Data
US 2009/0322994 A1    Dec. 31, 2009

(30) Foreign Application Priority Data
Jul. 3, 2006 (JP) .................................. 2006-183018

(51) Int. Cl.
*G02F 1/1333* (2006.01)
*G02F 1/1335* (2006.01)
(52) U.S. Cl. ............................ 349/122; 349/96; 349/119
(58) Field of Classification Search .................. 349/122, 349/96–98, 117–119
See application file for complete search history.

(56) References Cited

U.S. PATENT DOCUMENTS

| 7,160,611 | B2 | 1/2007 | Banba et al. |
| 7,503,988 | B2 * | 3/2009 | Hayashi et al. ................. 156/64 |
| 2003/0198807 | A1 | 10/2003 | Banba et al. |
| 2007/0035682 | A1 | 2/2007 | Ito et al. |

FOREIGN PATENT DOCUMENTS

JP     2001-272541 A     10/2001
(Continued)

OTHER PUBLICATIONS

International Search Report of PCT/JP2007/061600, mailing date of Jul. 10, 2007.
(Continued)

*Primary Examiner* — Dung T. Nguyen
(74) *Attorney, Agent, or Firm* — Westerman, Hattori, Daniels & Adrian, LLP

(57) ABSTRACT

A liquid crystal panel has a first optical film (4) adhered to a viewing side of a liquid crystal cell (2) through a first pressure-sensitive adhesive layer (3), and a second optical film (6) adhered to the reverse side of the liquid crystal cell (2) through a second pressure-sensitive adhesive layer (5). A creep value (L1) of the first pressure-sensitive adhesive layer (3) is from 50 to 3000 μm. A creep value (L2) of the second pressure-sensitive adhesive layer (5) is from 10 to 400 μm. The creep value (L1) of the first pressure-sensitive adhesive layer (3) is larger than the creep value (L2) of the second pressure-sensitive adhesive layer (5). The creep value means the shift amount after one hour of the pressure-sensitive adhesive layer having a thickness of 20 μm in a case where a tensile shearing force of 4.9 N is applied to an adhesive area of 10 $mm^2$ at 23° C.

8 Claims, 5 Drawing Sheets

FOREIGN PATENT DOCUMENTS

| | | |
|---|---|---|
| JP | 2001-350020 A | 12/2001 |
| JP | 2002-236213 A | 8/2002 |
| JP | 2003-50313 A | 2/2003 |
| JP | 2003-307621 A | 10/2003 |
| JP | 2005-62810 A | 3/2005 |
| JP | 2005-331909 A | 12/2005 |
| TW | 200606477 A | 2/2006 |
| WO | 2005/038517 A1 | 4/2005 |

OTHER PUBLICATIONS

Supplementary European Search Report dated Oct. 21, 2010, issued in corresponding European Patent Application No. 07744920.5.

Taiwanese Office Action dated Sep. 5, 2011, issued in corresponding Taiwanese Patent Application No. 096120981.(partial English translation).

Japanese Office Action dated Nov. 11, 2011, issued in corresponding Japanese Patent Application No. 2006-183018.(w/partial English translation).

Korean Office Action dated Oct. 26, 2010, issued in corresponding Korean Patent Application No. 10-2008-7024045 (Partial English Translation).

* cited by examiner

LIQUID CRYSTAL PANEL AND LIQUID CRYSTAL DISPLAY APPARATUS

TECHNICAL FIELD

The present invention relates to a liquid crystal panel, and a liquid crystal display apparatus.

BACKGROUND ART

Conventionally, a liquid crystal panel of a liquid crystal display apparatus is generally provided with a liquid crystal cell, and polarizing plates arranged on both surface sides of the liquid crystal cell, respectively. The liquid crystal cell has two liquid crystal cell substrates, a spacer interposed between the two substrates, and a liquid crystal material injected into a gap between the two substrates. The liquid crystal cell, into which the liquid crystal material is injected, itself has birefringence to generate a retardation. In order to compensate for this retardation of the liquid crystal cell, an optical compensation layer is usually provided between the liquid crystal cell and the polarizing plate (for example, Patent Document 1).

Usually, these optical films, such as polarizing plates are each adhered to a liquid crystal cell through a pressure-sensitive adhesive. The pressure-sensitive adhesive for the optical films is generally an acrylic-based pressure-sensitive adhesive from the viewpoint of transparency and durability.

Patent Document 1: JP-A-2003-344658

DISCLOSURE OF THE INVENTION

Incidentally, optical films easily stretch and contract under conditions that the films are heated or humidified. For this reason, after an optical film is adhered, the optical film is easily peeled off or separated in accordance with the stretch and contraction of the optical film.

In the case of using, in particular, a stretched film as the optical film, the film is relatively largely contracted in a main stretching direction thereof by applying heat or the like thereto.

When the optical film is contracted in this way, the liquid crystal panel is curved accordingly. As a result, light leakage is easily generated from the liquid crystal panel. The light leakage causes, for example, a problem that a black display level at a circumference of the panel falls when the liquid crystal panel is in a black display state.

An object of the present invention is to provide a liquid crystal panel making it possible to restrain light leakage from a circumference thereof in accordance with contraction of its optical film, and a liquid crystal display apparatus.

The present invention provides a liquid crystal panel comprising a first optical film adhered to a viewing side of a liquid crystal cell through a first pressure-sensitive adhesive layer, and a second optical film adhered to the reverse side of the liquid crystal cell through a second pressure-sensitive adhesive layer, wherein a creep value (L1) of the first pressure-sensitive adhesive layer is from 50 to 3000 μm, a creep value (L2) of the second pressure-sensitive adhesive layer is from 10 to 400 μm, and the creep value (L1) of the first pressure-sensitive adhesive layer is larger than the creep value (L2) of the second pressure-sensitive adhesive layer. The creep value means the shift amount after one hour of the pressure-sensitive adhesive layer having a thickness of 20 μm in a case where a tensile shearing force of 4.9 N is applied to an adhesive area of 10 mm$^2$ at 23° C.

In the preferable liquid crystal panel of the present invention, at least one of the first and second optical films is a polarizing plate comprising a polarizer.

In the preferable liquid crystal panel of the present invention, the first and second optical films are each a polarizing plate comprising a polarizer, an absorption axis direction of the polarizer of the first optical film is arranged in substantially parallel to a long side of the liquid crystal panel, and an absorption axis direction of the polarizer of the second optical film is arranged in substantially parallel to a short side of the liquid crystal panel.

In the preferable liquid crystal panel of the present invention, the above polarizer comprises a stretched film, and the absorption axis of the polarizer is generated in a main stretching direction of the stretched film.

In the preferable liquid crystal panel of the present invention, the ratio of the creep value (L1) of the first pressure-sensitive adhesive layer to the creep value (L2) of the second pressure-sensitive adhesive layer (L1/L2) is 30 or less.

In the preferable liquid crystal panel of the present invention, the ratio of the creep value (L1) of the first pressure-sensitive adhesive layer to the creep value (L2) of the second pressure-sensitive adhesive layer (L1/L2) is 2 or more.

In the preferable liquid crystal panel of the present invention, the ratio of the creep value (L1) of the first pressure-sensitive adhesive layer to the creep value (L2) of the second pressure-sensitive adhesive layer (L1/L2) is from 5 to 20.

Furthermore, the preferable liquid crystal panel of the present invention has a bezel provided at a circumference of the panel.

In the preferable liquid crystal panel of the present invention, the above first and second pressure-sensitive adhesive layers are each made mainly of an acrylic-based pressure-sensitive adhesive.

Also, according to another aspect of the present invention, a liquid crystal display apparatus has any one of the above liquid crystal panels.

The liquid crystal panel and the liquid crystal display apparatus of the present invention can prevent light leakage from a circumference of the panel so as to attain a good image display in the whole of the panel. In particular, according to the liquid crystal panel wherein the first and second optical films each comprise a polarizer that is a stretched film, the absorption axis direction of the polarizer of the first optical film is arranged in substantially parallel to the long side of the liquid crystal panel, and the absorption axis direction of the polarizer of the second optical film is arranged in substantially parallel to the short side of the liquid crystal panel, the light leakage from the circumference of the panel can be further prevented.

DETAILED DESCRIPTION OF THE INVENTION

The liquid crystal panel of the present invention comprises a first optical film adhered to a viewing side of a liquid crystal cell through a first pressure-sensitive adhesive layer, and a second optical film adhered to the reverse side of the liquid crystal cell through a second pressure-sensitive adhesive layer, wherein a creep value (L1) of the first pressure-sensitive adhesive layer is from 50 to 3000 μm, a creep value (L2) of the second pressure-sensitive adhesive layer is from 10 to 400 μm, and the creep value (L1) of the first pressure-sensitive adhesive layer is larger than the creep value (L2) of the second pressure-sensitive adhesive layer. Furthermore, the creep value (L1) of the first pressure-sensitive adhesive layer is preferably from 80 to 2500 μm, and more preferably from 150 to 2000 μm. On the other hand, the creep value (L2) of the second pressure-sensitive adhesive layer is preferably from 20 to 200 μm, and more preferably from 30 to 150 μm.

In the liquid crystal panel of the present invention, the first pressure-sensitive adhesive layer relaxes stress by contraction of the first optical film so that a deformation of the liquid crystal cell can be prevented. Hereinafter, the present invention will be specifically described.

Here, in the present invention, the pressure-sensitive adhesive includes any agent generally called an adhesive.

In the present invention, there is a case where the first and second pressure-sensitive adhesive layers may be collectively called the "pressure-sensitive adhesive layer". There is a case where the first and second optical films may be collectively called the "optical film".

<Constitution Example of the Liquid Crystal Panel>

Figure 1:
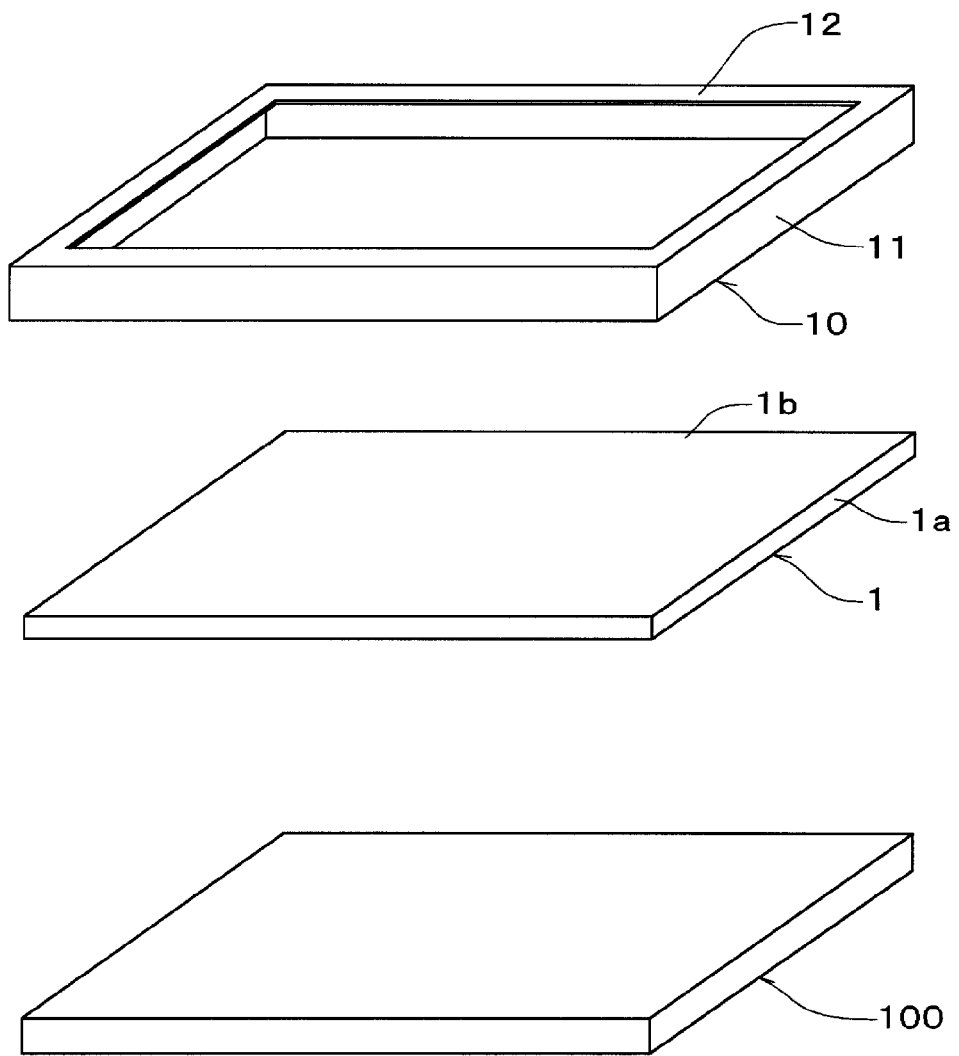
FIG. 1 is an exploded perspective reference view illustrating an embodiment of the liquid crystal panel of the present invention.
Figure 2:
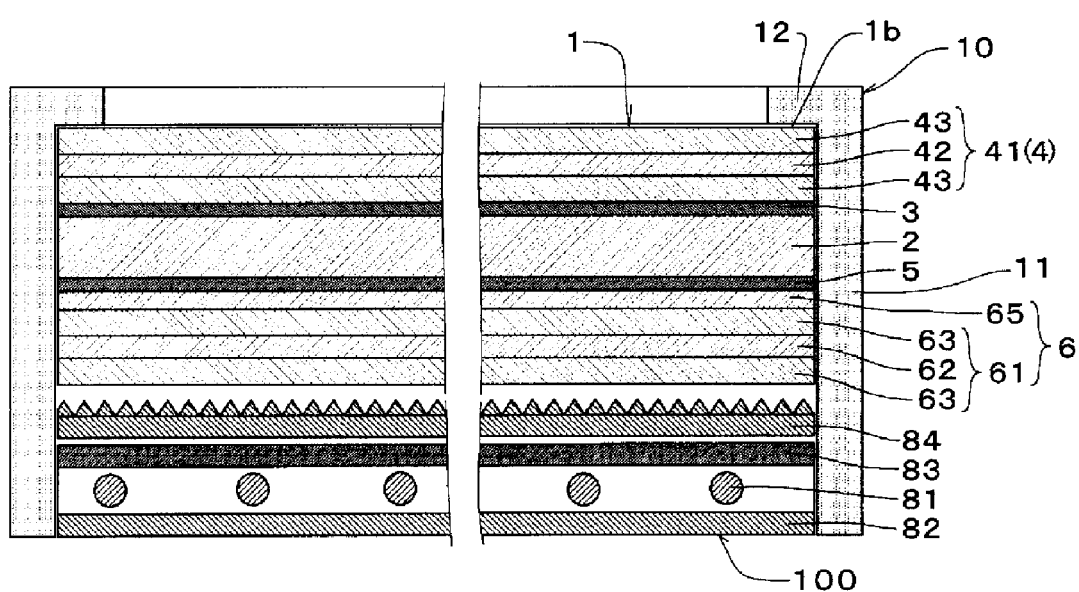
FIG. 2 is a center-omitted vertical sectional view illustrating an embodiment of the liquid crystal panel of the present invention.

In FIG. 1 and FIG. 2 are illustrated an example of the liquid crystal display apparatus comprising the liquid crystal panel of the present invention.

In the above drawing, the numeral 1 represents liquid crystal panel, the numeral 10 represents the bezel provided at the circumference of the liquid crystal panel 1, and the numeral 100 represents a light unit formed on the liquid crystal panel 1.

The bezel 10 is made of a known frame-form member. The bezel 10 has an opening for exposing a viewing side surface (image-displaying surface) of the liquid crystal panel 1. The bezel 10 has a side surface portion 11 for covering a side 1a of the liquid crystal panel 1, and a front surface portion 12, in a rectangular frame form, which is bent inwards from the side surface portion 11 to cover a viewing side surface circumference 1b of the liquid crystal panel 1.

The bezel 10 is fitted to the liquid crystal panel 1 in the state that the bezel 10 contacts the side 1a and the viewing side surface circumference 1b of the liquid crystal panel 1, or the bezel 10 is faced to the side 1a and the viewing side surface circumference 1b of the liquid crystal panel 1 with a slight gap therebetween.

The light unit 100 is formed on the reverse side of the liquid crystal panel 1 (what is called "back light unit").

In FIG. 2, the numeral 2 represents a liquid crystal cell, the numeral 3 represents a first pressure-sensitive adhesive layer formed on the viewing side of the liquid crystal cell 2, the numeral 4 represents a first optical film adhered to the liquid crystal cell 2 through the first pressure-sensitive adhesive layer 3, the numeral 5 represents a second pressure-sensitive adhesive layer formed on the reverse side of the liquid crystal cell, and the numeral 6 represents a second optical film adhered to the liquid crystal cell 2 through the second pressure-sensitive adhesive layer 5.

Here, the terms "first" and "second" are added for the sake of convenience in order to distinguish the corresponding constituting members from each other. Accordingly, the terms "first" and "second" never suggest any order of the optical film and the pressure-sensitive adhesive layer in arrangement, superiority, and the like.

The liquid crystal panel 1 is constructed in such a manner that the viewing side surface thereof is formed to have a rectangular shape as viewed in a front view. For that reason, the lateral length of the liquid crystal panel 1 is formed to be longer than the longitudinal length thereof. The ratio of the lateral and longitudinal lengths of the liquid crystal panel 1 is not particularly limited; however, the ratio is generally such that the lateral length:longitudinal length=4:3, 16:9, or the like.

The liquid crystal cell 2 may be adopted from one out of various liquid crystal cell known in the prior art. For example, the liquid crystal cell 2 comprises a pair of liquid crystal cell substrate, a spacer interposed between the liquid crystal cell substrates, a liquid crystal material injected between the pair of the liquid crystal cell substrates, a color filter formed on the inner surface of the liquid crystal cell substrate on the viewing side, and an electrode element such as a TFT substrate for driving that is formed on the inner surface of the other liquid crystal cell substrate.

The liquid crystal cell substrates are not particularly limited as far as they are excellent in transparency. As the liquid crystal cell substrates, for example, transparent glass plates such as soda-lime glass, low-alkali borosilicate glass and non-alkali aluminoborosilicate glass, and optical resin plates such as polycarbonate, polymethyl methacrylate, polyethylene terephthalate, and epoxy resin can be used. These are transparent plates having flexibility.

The liquid crystal material is not particularly limited as far as the material can be in a liquid crystal phase. The mode of the liquid crystal cell 2 can be appropriately selected. The liquid crystal cell 2 may be in any mode, for example, a VA mode, an IPS mode, a TN mode, an STN mode, or an OCB mode. Particularly preferred is the liquid crystal cell 2 in a VA (vertically-aligned) mode since the liquid crystal cell can realize a very high contrast.

In addition, for the pressure-sensitive adhesive constituting the first pressure-sensitive adhesive layer 3, there is used a pressure-sensitive adhesive causing the creep value (L1) of the first pressure-sensitive adhesive layer 3 to be set into the range of from 50 to 3000 μm, preferably into the range of from 80 to 2500 μm, and more preferably into the range of from 150 to 2000 μm.

For the pressure-sensitive adhesive constituting the second pressure-sensitive adhesive layer 5, there is used a pressure-sensitive adhesive causing the creep value (L2) of the second pressure-sensitive adhesive layer 5 to be set into the range of from 10 to 400 μm, preferably into the range of from 20 to 200 μm, and more preferably into the range of 30 to 150 μm.

For the pressure-sensitive adhesives constituting the first pressure-sensitive adhesive layer 3 and the second pressure-sensitive adhesive layer 5, there are used pressure-sensitive adhesives making the creep value (L1) of the first pressure-sensitive adhesive layer 3 larger than the creep value (L2) of the second pressure-sensitive adhesive layer 5. The ratio of the creep value (L1) of the first pressure-sensitive adhesive layer 3 to the creep value (L2) of the second pressure-sensitive adhesive layer 5 (L1/L2) is 30 or less, and preferably 20 or less. On the other hand, the ratio of the creep value (L1) of the first pressure-sensitive adhesive layer 3 to the creep value (L2) of the second pressure-sensitive adhesive layer 5 (L1/L2) is 2 or more, preferably 5 or more. The particularly preferred ratio of the creep value (L1/L2) is from 5 to 20.

As the pressure-sensitive adhesives of the first pressure-sensitive adhesive layer 3 and the second pressure-sensitive adhesive layer 5, for example, an acrylic-based pressure-sensitive adhesive, a urethane-based pressure-sensitive adhesive, a silicone-based pressure-sensitive adhesive, and the like can be used. Out of the adhesives, an acrylic-based pressure-sensitive adhesive is preferred since the adhesive is excellent in transparency, weather resistance, and the like.

The thickness of the first pressure-sensitive adhesive layer 3 and the second pressure-sensitive adhesive layer 5 is not particularly limited, and is from about 5 to 40 µm, and preferably from about 10 to 30 µm as the dried-film thickness thereof.

The acrylic-based pressure-sensitive adhesives used in the first pressure-sensitive adhesive layer 3 and the second pressure-sensitive adhesive layer 5 will be described in detail later.

The first optical film 4 and the second optical film 6 may be adopted from one out of various films known in the prior art. As the first optical film 4, for example, a polarizing plate 41 (hereinafter referred to as a first polarizing plate 41) can be used. As the second optical film 6, for example, a polarizing plate 61 (hereinafter referred to as a second polarizing plate 61) having an optical compensation layer 65 can be used. This optical compensation layer 65 may be made of a single layer, or may be made of two or more of multilayers. The optical compensation layer 65 may be provided directly onto a surface of the polarizing plate 61, or may be adhered thereto through a pressure-sensitive adhesive known in the prior art.

The first polarizing plate 41 is adhered directly onto the viewing side surface of the liquid crystal cell 2 through the first pressure-sensitive adhesive layer 3. The second polarizing plate 61 having the optical compensation layer 65 is adhered directly onto the reverse surface of the liquid crystal cell 2 through the second pressure-sensitive adhesive layer 5. However, other optical films may be interposed between the first polarizing plate 41 and/or the second polarizing plate 61 and the liquid crystal cell 2.

The polarizing plates 41 and 61 each include a polarizer for taking out linearly polarized light. The polarizing plates 41 and 61 each preferably include a polarizer and a protective film laminated on a surface of the polarizer, and each more preferably include a polarizer and protective films laminated onto both surfaces of the polarizer. The kind of the polarizer is not particularly limited, the polarizer is preferably a stretched film into which iodine is adsorbed. In the polarizer made of the stretched film, the absorption axis thereof is generated in a main stretching direction of the stretched film.

In FIG. 2 are illustrated the first polarizing plate 41 and the second polarizing plate 61 wherein protective films 43 and 63 are laminated on both surfaces of a polarizer 42 and 62, respectively.

In the first polarizing plate 41, one of the protective films 43 is adhered to the viewing side surface of the liquid crystal cell 2 through the first pressure-sensitive adhesive layer 3. In the second polarizing plate 61, the optical compensation layer 65 is adhered to the reverse surface of the liquid crystal cell 2 through the second pressure-sensitive adhesive layer 5, so as to be adhered to the reverse surface of the liquid crystal cell 2.

In addition, materials for forming the optical films such as the polarizers, the protective films, the optical compensation layer, and the like will be described in detail later.

Figure 3:
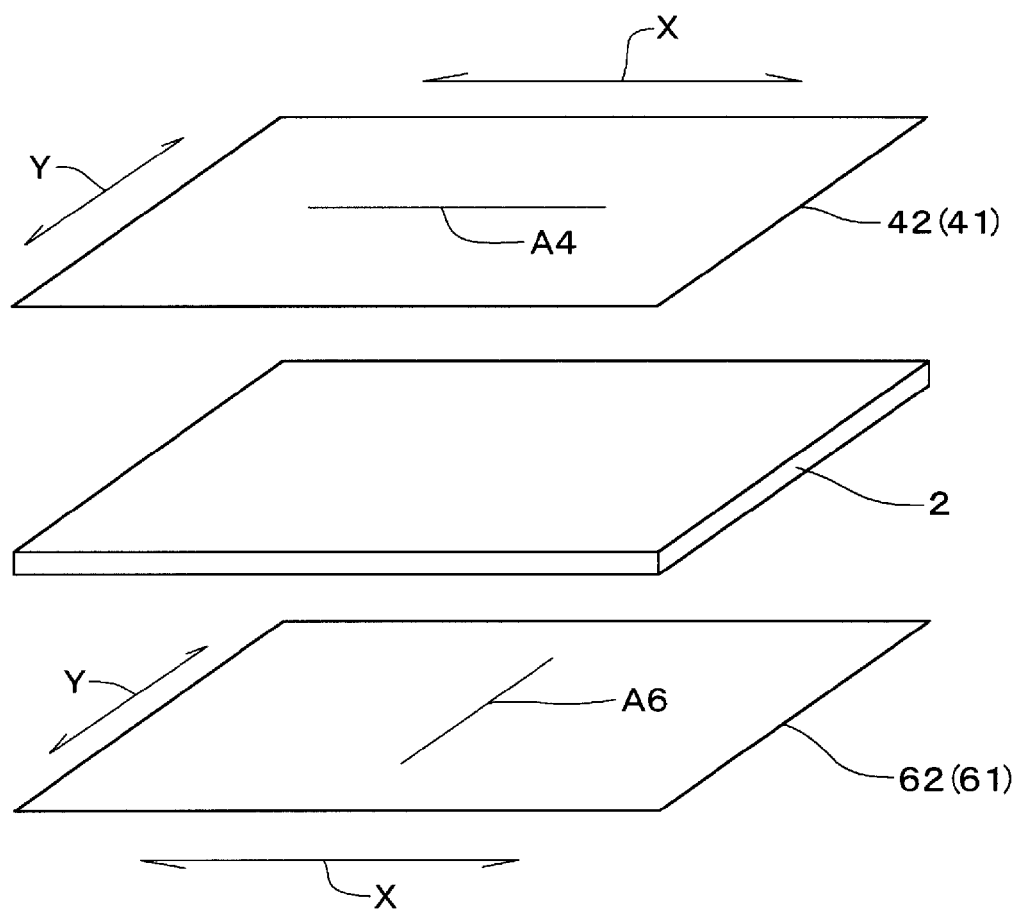
FIG. 3 is a perspective reference view illustrating an arrangement of a polarizing plate on the side for viewing and a polarizing plate on the side reverse thereto.

The first polarizing plate 41 and the second polarizing plate 61 are arranged to make the individual absorption axis directions thereof substantially perpendicular to each other. For example, as illustrated in FIG. 3, the first polarizing plate 41 is adhered to the liquid crystal 2 to make the absorption axis direction A4 of the polarizer 42 substantially parallel to the long side (lateral) direction X of the liquid crystal panel. On the other hand, the second polarizing plate 61 is adhered to the liquid crystal cell 2 to make the absorption axis direction A6 of the polarizer 62 substantially parallel to the short side (vertical) direction Y of the liquid crystal panel. However, "substantially parallel" includes that the angle made between the absorption axis direction A4 and the long side direction X, and the angle made between the absorption axis direction A6 and the short side direction Y are each from 0 degrees±5 degrees.

The liquid crystal panel 1 of the present invention can be prevented from being curved under a condition of heating or the like, and light leakage form a circumference of the panel can be restrained. It appears that the restraint of the light leakage in the liquid crystal panel 1 of the present invention is based on the following effect.

In general, heat generated when a liquid crystal panel is driven is applied to its optical film, whereby the optical film is contracted. Following this contraction, the liquid crystal panel is curved. In particular, in a case where the optical film includes a stretched film, heat or the like is applied thereto, whereby the film is largely contracted in the stretching direction thereof. Thus, stress of the contraction is applied to the liquid crystal cell so that the liquid crystal panel is largely curved.

When the liquid crystal panel is curved as described above, the circumference of the panel is strongly brought into contact with the bezel so that the light leakage is generated from the circumference of the panel.

Figure 4A:
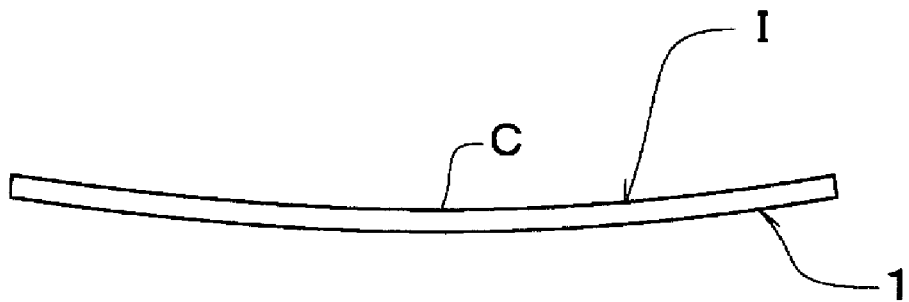
FIGS. 4A and 4B are reference view illustrating a curved state of a liquid crystal panel.

As described above, in the liquid crystal panel 1 of the present invention, the absorption axis direction A4 of the polarizer 42 of the first polarizing plate 41 is arranged in substantially parallel to the long side of the liquid crystal panel 1. In other words, the stretching direction of the polarizer 42 is arranged in substantially parallel to the long side of the liquid crystal panel 1 (in a polarizer made of a stretched film, an absorption axis is generated in a main stretching direction thereof). For this reason, the first polarizing plate 41 is largely contracted in the long side direction of the liquid crystal panel 1 under a condition of heating or the like. When the first polarizing plate 41 is contracted in the long side direction of the liquid crystal panel 1, the liquid crystal panel 1 curves into a concave form. Herein, "curves into a concave form" means that as illustrated in FIG. 4A, the center C of the viewing side surface of the liquid crystal panel 1 curves so as to project into the side reverse to the viewing side surface I.

The creep value of the first pressure-sensitive adhesive layer 3 for adhering this first polarizing plate 41 is larger than that of the second pressure-sensitive adhesive layer 5, and further the creep value (L1) is from 50 to 3000 µm. For this reason, the first pressure-sensitive adhesive layer 3 sufficiently relaxes contraction stress when the first polarizing plate 41 contracts in the long side direction, so as to restrain the liquid crystal panel 1 from curving largely into a concave form.

Figure 4B:
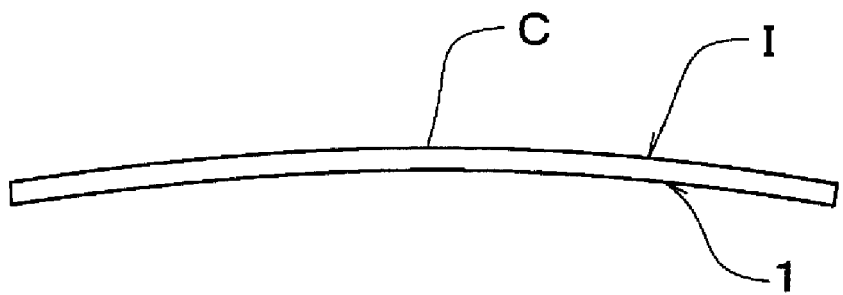

On the other hand, about the second polarizing plate 61, the absorption axis direction A6 of the polarizer 62 thereof is arranged substantially perpendicularly to the long side of the liquid crystal panel 1. In other words, the stretching direction of the polarizer 62 is arranged substantially perpendicularly to the long side of the liquid crystal panel 1. For this reason, the second polarizing plate 61 is slightly contracted in the long side direction of the liquid crystal panel 1 under a condition of heating or the like. When the second polarizing plate 61 is slightly contracted in the long side direction of the liquid crystal panel 1, the liquid crystal panel 1 curves into a convex form. Herein, "curves into a convex form" means that as illustrated in FIG. 4B, the center C of the viewing side surface of the liquid crystal panel 1 curves so as to project into the viewing side surface I side.

The creep value of the second pressure-sensitive adhesive layer 5 for adhering this second polarizing plate 61 is smaller than that of the first pressure-sensitive adhesive layer 3, and further the creep value (L2) is from 10 to 400 μm. For this reason, the second pressure-sensitive adhesive layer 5 less relaxes contraction stress than the first pressure-sensitive adhesive layer 3. Accordingly, the contraction stress when the second polarizing plate 61 is slightly contracted in the long side direction is easily applied to the liquid crystal cell so that the liquid crystal panel 1 slightly curves into a convex form.

In the present invention, the contraction of the first polarizing plate 41 restrains the liquid crystal cell 2 from curving largely into a concave form while the contraction of the second polarizing plate 61 allows the liquid crystal cell 2 to curve slightly into a convex form. In this way, the concave-form curving and the convex-form curving of the liquid crystal cell 2 cancel each other. It therefore appears that the liquid crystal panel 1 of the present invention does not curve easily as a whole under a condition of heating or the like (that is, the panel is kept in a flat state) so that the light leakage from the circumference of the panel can be prevented.

Here, in the liquid crystal panel 1 of the present invention, it is preferred that the absorption axis direction A4 of the polarizer 42 of the first polarizing plate 41 is arranged in substantially parallel to the long side of the panel 1 and further the absorption axis direction A6 of the polarizer 62 of the second polarizing plate 61 is arranged substantially perpendicularly to the absorption axis direction A4 of the polarizer 42 of the first polarizing plate 41, as described above. However, the liquid crystal panel 1 of the present invention is not limited to this arrangement, and may be changed into various arrangements.

In the liquid crystal panel of the present invention, for example, it is allowable that the absorption axis direction of the polarizer of the first polarizing plate is arranged at an angle of 45 degrees+5 degrees to the long side direction of the liquid crystal panel and further the absorption axis direction of the polarizer of the second polarizing plate is arranged substantially perpendicularly to the absorption axis direction of the first polarizing plate (not illustrated). In addition, in the liquid crystal panel of the present invention, it is also allowable that the absorption axis direction of the polarizer of the first polarizing plate is arranged in substantially parallel to the short side of the liquid crystal panel and further the absorption axis direction of the polarizer of the second polarizing plate is arranged substantially perpendicularly to the absorption axis direction of the first polarizing plate (not illustrated).

Further, in the liquid crystal panel 1, as an example of the second optical film 6, the polarizing plate 61 having the optical compensation layer 65 is exemplified. However, the liquid crystal panel 1 is not limited thereto. For example, a polarizing plate provided with an optical compensation layer may also be used as the first optical film 4. Alternatively, a polarizing plate provided with an optical compensation layer may also be used as each of the first and second optical films 4 and 6.

Here, the first optical film 4 and/or the second optical film 6 may be provided with a layer or film other than the above polarizers, protective films and optical compensation layer.

Next, as illustrated in FIG. 2, the backlight unit 100 is preferably provided with at least light sources 81, a reflective film 82, a diffuser 83, and a prism sheet 84.

Here, in FIG. 2, a transmission type or semi-transmission type liquid crystal panel wherein the backlight unit 100 is arranged is exemplified. However, the present invention is not limited to the liquid crystal panel 1 having the backlight unit 100. For example, the liquid crystal panel 1 of the present invention may be a transmission type or semi-transmission type panel wherein a light source (front light) is arranged on the viewing side thereof or a light source (side light) may be arranged on a side thereof (not illustrated). The liquid crystal panel 1 of the present invention may also be a reflection type panel wherein an external fluorescent lamp or sunlight is used as a light source (not illustrated).

<Acrylic-Based Pressure-Sensitive Adhesive>

The acrylic-based pressure-sensitive adhesive constituting the pressure-sensitive adhesive of the present invention contains, as a base polymer thereof, a (meth)acrylic-based polymer having a main backbone made of a monomer unit of an alkyl (meth)acrylate.

Herein, "(meth)acrylic" includes acrylic and/or methacrylic, and "(meth)acrylate" includes acrylate and/or methacrylate.

The alkyl group of the alkyl (meth)acrylate, which constitutes the main backbone of the acrylic-based polymer, has from about 1 to 18 carbon atoms, preferably from about 1 to 9 carbon atoms. A specific example of the alkyl (meth)acrylate is methyl (meth)acrylate, ethyl (meth)acrylate, propyl (meth)acrylate, n-butyl (meth)acrylate, iso-butyl (meth)acrylate, 2-ethylhexyl (meth)acrylate, n-octyl (meth)acrylate, iso-octyl (meth)acrylate, lauryl (meth)acrylate, isononyl (meth)acrylate, stearyl (meth)acrylate, cyclohexyl (meth)acrylate, and the like. The alkyl (meth)acrylate can be suitably selected from those exemplified above, and can be used alone or two or more kinds. The average number of carbon in the alkyl group of the alkyl (meth)acrylate is preferably from 3 to 9.

One or more of various monomers are introduced into the (meth)acrylic-based polymer by copolymerization for the purpose of improving adherence property or heat resistance. Examples of such a copolymerizable monomer include hydroxyl-group-containing (meth)acrylic-based monomers; carboxyl-group-containing monomers such as (meth)acrylic acid; acid anhydride-group-containing monomers such as maleic anhydride; an adduct of caprolactone to acrylic acid; sulfonic-acid-group-containing monomers such as styrenesulfonic acid; phosphoric-acid-group-containing monomers; and the like. Of these monomers, preferred are hydroxyl-group-containing (meth)acrylic-based monomers and carboxyl-group-containing monomers from the viewpoint of adherence property to the liquid crystal cell.

A specific example of the hydroxyl-group-containing (meth)acrylic-based monomer is, for example, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, 4-hydroxymethylcyclohexyl-methylacrylate, and the like. The hydroxyl-group-containing (meth)acrylic-based monomer can be suitably selected from those exemplified above, and can be used alone or two or more kinds.

About the hydroxyl-group-containing (meth)acrylic-based monomers, the alkyl group in their hydroxyalkyl preferably has 4 or more carbon atoms. In the case of introducing a hydroxyl-group-containing (meth)acrylic-based monomer wherein the alkyl group in its hydroxyalkyl has 4 or more carbon atoms into the (meth)acrylic-based polymer, it is preferred to use an alkyl (meth)acrylate wherein the number of carbon atoms in the alkyl group is equal to or less than the number of the carbon atoms in the alkyl group of the hydroxyl-group-containing (meth)acrylic-based monomer. In the case of using, for example, 4-hydroxybutyl (meth) acrylate as the hydroxyl-group-containing (meth)acrylic monomer, it is preferred to use butyl (meth)acrylate, or an alkyl (meth)acrylate wherein the number of carbon atoms in the alkyl group of the alkyl (meth)acrylate is less than that of butyl (meth)acrylate.

The copolymerization amount of the copolymerizable monomer, such as a hydroxyl-group-containing (meth) acrylic-based monomer, is from 0.01 to 10 parts by weight based on 100 parts by weight of the alkyl (meth)acrylate. If the copolymerization amount of the hydroxyl-group-containing (meth)acrylic-based monomer is less than 0.01 parts by weight, the number of cross-linking points with an isocyanate cross-linking agent or the like is decreased so that it is not preferable from the viewpoint of adhesion to the optical film or durability. On the other hand, if the amount is more than 10 parts by weight, the number of the cross-linking points becomes too large so that it is not preferable.

Above all, the copolymerization amount of the copolymerizable monomer is preferably from 0.01 to 5 parts by weight, and more preferably from 0.03 to 3 parts by weight based on 100 parts by weight of the alkyl (meth)acrylate.

In addition, the (meth)acrylic-based polymer may contain an other copolymerizable component other than the alkyl (meth)acrylate and the hydroxyl-group-containing (meth) acrylic monomer. Examples of the other copolymerizable component include benzyl (meth)acrylate, methoxyethyl (meth)acrylate, ethoxymethyl (meth)acrylate, phenoxyethyl (meth)acrylate, (meth)acrylamide, vinyl acetate, (meth) acrylic nitrile, and the like. However, the other copolymerizable component is not limited these components. The copolymerization amount of the other copolymerizable component is 100 parts by weight or less, preferably 50 parts by weight or less based on 100 parts by weight of the alkyl (meth)acrylate.

The weight-average molecular weight of the (meth) acrylic-based polymer is not particularly limited, and is preferably from about 500000 to 2500000. The (meth)acrylic-based polymer may be produced by a known method. The producing method may be appropriately selected from radical polymerizations such as bulk polymerization and solution polymerization, suspension polymerization. As a radical polymerization initiator, various known polymerization initiators such as azo-based and peroxide-based initiators can be used. The reaction temperature and the reaction time are usually set into the range of from about 50 to 80° C. and that of 1 to 8 hours, respectively. Of the producing methods, the solution polymerization is preferred. A solvent used for the (meth)acrylic-based polymer is generally ethyl acetate, toluene, and the like. The concentration in the solution is usually from about 20 to 80% by weight.

When a peroxide is used as the polymerization initiator, a remaining portion of the peroxide that has not been used for the polymerization reaction may be used in cross-linking reaction that will be described later.

Preferably, a cross-linking agent is further blended with the acrylic-based pressure-sensitive adhesive of the present invention. Examples of the cross-linking agent include isocyanate-based compounds, peroxides, and the like.

Examples of the isocyanate-based compounds include isocyanate monomers such as tolylenediisocyanate, chlorphenylenediisocyanate, hexamethylenediisocyanate, tetramethylenediisocyanate, isophoronediisocyanate, xylylenediisocyanate, diphenylmethanediisocyanate, and hydrogenerated diphenylmethanediisocyanate; adduct type isocyanate compounds result from additional reaction of these isocyanate monomers and polyalcohol such as trimethylolpropane; isocyanurate compounds; burette type compounds; urethane prepolymer type isocyanate result from additional reaction of polyether polyol, polyester polyol, acrylic polyol, polybutadiene polyol, or polyisoprene polyol; and the like. Of these isocyanate-based compounds, preferred are adduct type isocyanate compounds, such as xylylenediisocyanate, from the viewpoint of improving adhesion to the optical film.

The amount of the isocyanate-based compound used may be set into an appropriate amount so as to cause the first and second pressure-sensitive adhesive layers to have the above creep values. The setting is affected by the material(s) for producing the (meth)acrylic-based polymer, the molecular weight thereof, thus, the amounts cannot be mentioned without reservation. Here, in general, the creep value of the acrylic-based pressure-sensitive adhesive becomes smaller as the number of cross-linking points therein becomes larger. Accordingly, in general, in the acrylic-based pressure-sensitive adhesive composition which constitutes the first pressure-sensitive adhesive layer, the amount of the isocyanate-based compound used is made smaller than in the acrylic-based pressure-sensitive adhesive composition which constitutes the second pressure-sensitive adhesive layer.

The amount of the isocyanate-based compound used is usually from 0.001 to 2 parts by weight, preferably from 0.01 to 1.5 parts by weight, and more preferably from 0.02 to 1 part by weight based on 100 parts by weight of the (meth)acrylic-based polymer. If the amount of the isocyanate-based compound used is less than 0.001 parts by weight, it is not preferable from the viewpoint of adhesion to the optical film or durability.

In the case of blending a peroxide, the peroxide is not particularly limited as far as the peroxide is heated to generate radicals, thereby making it possible to crosslink the (meth) acrylic-based polymer. About the peroxide, the one-minute half-life temperature is from about 70 to 170° C., and preferably from 90 to 150° C., considering the productivity. If a peroxide, the one-minute half-life temperature of which is too low, is used, the cross-linking reaction proceeds before the pressure-sensitive adhesive is coated. As a result, it is feared that viscosity of the coating material rises so that the material cannot be coated. On the other hand, if a peroxide, the one-minute half-life temperature of which is too high, is used, the temperature at the cross-linking reaction becomes high so that other side effects may be generated. Alternatively, the peroxide is insufficiently decomposed so that an intended property may not be gained, or the peroxide remains in a large amount, whereby the cross-linking reaction may proceed afterwards.

For reference, the half-life of a peroxide is an index of the decomposition rate of the peroxide, and is a time when the decomposition amount of the peroxide becomes a half. Makers' catalogues describe about the decomposition temperature for obtaining the half-life at arbitrary time, and the half-life time at arbitrary temperature. These are described in, for example, Organic Peroxide Catalogue, $9^{th}$ version (May in 2003) of NOF Corporation.

Examples of the above peroxide include di(2-ethylhexyl) peroxy dicarbonate, di(4-t-butylcyclohexyl)peroxy dicarbonate, di-sec-butylperoxy dicarbonate, t-butylperoxy neodecanoate, t-hexylperoxy pivalate, t-butylperoxy pivalate, dilauroyl peroxide, di-n-octanoyl peroxide, 1,1,3,3-tetramethylbutylperoxy isobutylate, dibenzoyl peroxide (BPO), and the like. Of these peroxides, preferred are di(4-t-butylcyclohexyl)peroxy dicarbonate, dilauroyl peroxide, and dibenzoyl peroxide since these peroxides are particularly excellent in cross-linking reaction efficiency.

The amount of the peroxide used may be set to be an appropriate amount to cause the first and second pressure-sensitive adhesive layers to have the above creep values. The amount of the peroxide used is usually from 0.02 to 2 parts by weight, preferably from 0.05 to 1 part by weight, and more preferably from 0.06 to 0.5 parts by weight based on 100 parts by weight of the (meth)acrylic-based polymer. If the amount of the peroxide used is less than 0.02 parts by weight, the cross-linking reaction gets insufficient so that it is not preferable from the viewpoint of durability. On the other hand, if the use amount is more than 2 parts by weight, the cross-linking may become too large.

Furthermore, various additives may be optionally blended with the acrylic-based pressure-sensitive adhesive of the present invention. The additives are blended as far as the object of the present invention can be attained. Examples of the additives include as a tackifier, a plasticizer, a filler (for example, glass fiber, glass beads, metal powder, and other inorganic powder), a pigment, a colorant, an antioxidant, an ultraviolet absorber, a silane coupling agent, and the like. In addition, by incorporating fine particles into the pressure-sensitive adhesive, the pressure-sensitive adhesive exhibiting light-scattering property can be constituted.

A silane coupling agent is preferably blended with the acrylic-based pressure-sensitive adhesive of the present invention. The silane coupling agent can give durability, in particular, an effect of restraining the peeling under a humidification condition to the pressure-sensitive adhesive.

Examples of the silane coupling agent include silicon compound having epoxy structure such as 3-glycidoxypropyltrimethoxysilane, 3-glycidoxypropylmethyldimethoxysilane, and 2-(3,4-epoxycyclohexyl)ethyltrimethoxysilane; amino-group-containing silicon compound such as 3-aminopropyltrimethoxysilane, N-(2-aminoethyl)3-aminopropyltrimethoxysilane, and N-(2-aminoethyl)-3-aminopropylmethyldimethoxysilane; 3-chloropropyltrimethoxysilane; (meth)acrylic-group-containing silane coupling agent such as acetoacetyl-group-containing trimethoxysilane, 3-acryloxypropyltrimethoxysilane, and 3-methacryloxypropyltriethoxysilane; isocyanate-group-containing silane coupling agent such as 3-isocyanatepropyltriethoxysilane; and the like. Particularly preferred are 3-glycidoxypropyltrimethoxysilane and acetoacetyl-group-containing trimethoxysilane since the peeling of the optical film can be effectively prevented. The amount of the silane coupling agent used is 1 part by weight or less, preferably from 0.01 to 1 part by weight, and more preferably from 0.02 to 0.6 parts by weight based on 100 parts by weight of the (meth)acrylic-based polymer. If the amount of the silane coupling agent used becomes large, adhering strength to the liquid crystal cell becomes too large so that the re-workability or the like may be affected.

Anchor coat layers may be provided between the first pressure-sensitive adhesive layer and/or the second pressure-sensitive adhesive layer and the optical film(s). A material for forming the anchor coat layer is not particularly limited, and is preferably a compound capable of having a good adhesion to each of the pressure-sensitive adhesive layer and the optical film and forming a coating excellent in cohesive force. As the anchor coat layer having such a nature, for example, various polymers, sol of a metal oxide, and silica sol can be used. Of these materials, polymers are preferred.

Examples of the polymers include polyurethane-based resins, polyester-based resins, polymers each containing an amino group in its molecule. The form of the polymers used may be any one of a solvent-soluble form, a water-dispersible form, and a water-soluble form. Examples thereof include water-soluble polyurethane, water-soluble polyester, water-soluble polyamide, and water-dispersible resin (such as ethylene-vinyl acetate-based emulsion, (meth)acrylic-based emulsion). The water-dispersible polymers may be a polymer obtained by emulsifying one of various resins such as polyurethane, polyester and polyamide by use of an emulsifier, or a self-emulsified product obtained by introducing an anionic group, a cationic group, or a nonionic group of a water-dispersible hydrophilic group into the above resins. An ionic polymer complex may also be used.

Such polymers preferably have a functional group reactive with the isocyanate-based compound in the acrylic-based pressure-sensitive adhesive. The polymers each having the reactive functional group are preferably a polymer having an amino group in its molecule, and more preferably a polymer having a primary amino group at its terminal.

Examples of the polymer having an amino group in its molecules include a polymer of amino-group-containing monomers such as polyethyleneimine, polyallylamine, polyvinylamine, polyvinylpyridine, polyvinylpyrrolidine, and dimethylaminoethylacrylate. Of these polymers, a preferred polymer having amino group is polyethyleneimine.

The polyethyleneimine is not particularly limited, and may be used appropriately. The weight-average molecular weight of the polyethyleneimine is not particularly limited, and is usually from about 100 to 1000000. Examples of a commercially available product of such a polyethyleneimine include such as trade name: EPOMIN SP series (SP-003, SP006, SP012, SP018, SP103, SP110, SP200, and the like), and EPOMIN P-1000 manufactured by Nippon Shokubai Co., Ltd. Of these products, preferred is trade name: EPOMIN P-1000.

It is sufficient that polyethyleneimine has a polyethylene structure. The polyethyleneimine is, for example, an adduct of ethyleneimine to a polyacrylic ester and/or an adduct of polyethyleneimine to a polyacrylic ester. The polyacrylic ester is obtained by subjecting the various alkyl (meth)acrylates exemplified about the (meth)acrylic-based polymer, and a monomer copolymerizable therewith to emulsion polymerization in a usual manner. As the copolymerizable monomer, a monomer having a functional group such as a carboxyl group is used, for causing ethyleneimine or the like to react. The ratio of the monomer used, which has a functional group such as a carboxyl group, is appropriately adjusted in accordance with the ratio of ethyleneimine to be caused to react. In addition, as the copolymerizable monomer, a styrene-based monomer is preferably used. An adduct wherein polyethyleneimine is grafted may also be prepared by causing a carboxyl group or the like in an acrylic acid ester to react with separately-synthesized polyethyleneimine. Particularly preferred examples of a commercially available product of the polyethyleneimine include POLYMENT NK-380 and 350, manufactured by Nippon Shokubai Co., Ltd.

Further, as the polyethyleneimine, an adduct of ethyleneimine to an acrylic-based polymer emulsion and/or an adduct of polyethyleneimine to an acrylic polymer emulsion can be used. Examples of a commercially available product thereof include POLYMENT SK-1000, manufactured by Nippon Shokubai Co., Ltd.

The polyallylamine is not particularly limited and is, for example, allylamine-based compounds such as diallylamine hydrochloride-sulfur dioxide copolymer, diallymethylamine hydrochloride copolymer, polyallylamine hydrochloride, and polyallylamine; condensation product of dicarboxylic acid and polyalkylene polyamine such as diethylenetriamine; an adduct of epihalohydrin to the condensation product; polyvinylamine; and the like. The polyallylamine is preferably used, because it is soluble in water or alcohol. The weight-average molecular weight of the polyallylamine is not particularly limited, but preferably that is from about 10000 to 100000.

It is also allowable to incorporate, into the material for forming the anchor coat layer, not only polymers each having an amino group in its molecule, but also a compound reactive with the polymers. The strength of the formed anchor coat layer can be improved by cross-linking of the compound to the polymers containing an amino group. Examples of the compound reactive with the polymers containing an amino group include such as epoxy compounds.

The acrylic-based pressure-sensitive adhesive which constitutes the first and second pressure-sensitive adhesive layers is usually coated onto a surface of the optical film, and is used in a form of a pressure-sensitive adhesive attached optical film. In the case of use, the pressure-sensitive adhesive attached optical film is adhered onto the liquid crystal cell through the pressure-sensitive adhesive.

The method for forming the pressure-sensitive adhesive layer is not particularly limited, and examples thereof include a method of coating a pressure-sensitive adhesive solution onto the optical film and then drying the resultant, and a method of transferring the pressure-sensitive adhesive layer by use of a releasing sheet on which the layer is provided. Examples of the coating method include a reverse coating method, a roll coating method such as a gravure coating method, a spin coating method, a screen coating method, a fountain coating method, a dip coating method, a spray coating method, or the like. The thickness of the pressure-sensitive adhesive layer is not particularly limited, and is preferably from about 10 to 40 µm.

Examples of the releasing sheet include a film of synthetic resin such as polyethylene, polypropylene, polyethylene and terephthalate; thin leaf bodies such as a rubber sheet, a paper, a cloth, a nonwoven cloth, a net, a foamed sheet, a metal foil, laminates of these sheets, and the like. The surface of the releasing sheet may be optionally subjected to peeling treatment for gaining low adherence, such as silicone treatment, long-chain alkyl treatment, or fluorine treatment, in order to heighten the releasability from the pressure-sensitive adhesive layer.

When providing the anchor coat layer, the anchor coat layer is formed on the optical film, and subsequently the pressure-sensitive adhesive layer is formed thereon. For example, a solution of an anchor component such as a solution of polyethyleneimine in water is coated by use of the coating method, such as the coating method, the dip coating method, the spray coating method, or the like, and then the resultant is dried to form the anchor coat layer.

The thickness of the anchor coat layer is from about 10 to 500 nm, and preferably from about 50 to 500 nm. If the thickness of the anchor coat layer is too small, sufficient strength is not exhibited so that sufficient adhesion may not be obtained. If the anchor coat layer is too thick, optical characteristics may be lowered.

When the pressure-sensitive adhesive layer and the like are formed, the optical film may be subjected to activating treatment. For the activating treatment, various methods may be adopted. Examples of the activating treatment include corona treatment, low-pressure UV treatment, plasma treatment, or the like. Moreover, an antistatic layer may be formed on the optical film.

Here, each layer such as the optical film or the pressure-sensitive adhesive layer may have ultraviolet absorbing property. The ultraviolet absorbing property is given to each layer, for example, by subjecting each layer to treatment with an ultraviolet absorber such as a salicylate ester-based compound, a benzophenol-based compound, a benzotriazole-based compound, a cyanoacrylate-based compound, and a nickel complex salt-based compound.

<Optical Film>

The following will describe the material for forming the optical film used in the liquid crystal panel of the present invention in more detail.

A polarizer is an optical film for obtaining a specific polarized light ray. The polarizer is, for example, a film obtained by allowing a dichroic substance (iodine, a dichroic dye, and the like) to be adsorbed into a hydrophilic polymer film (polyvinyl alcohol-based film, partially formalated polyvinyl alcohol-based film, ethylene-vinyl acetate copolymer-based partially saponified film, and the like) and subjected to uniaxial stretching; a polyene-based oriented film such as dehydrated product of polyvinyl alcohol, and dehydrochlorinated product of polyvinyl chloride. Of these, the polarizer is preferably a stretched film obtained by allowing a dichroic substance such as iodine to be adsorbed into a polyvinyl alcohol-based film. The thickness of the polarizer is not particularly limited; however, it is generally from about 5 to 80 µm.

The polarizer made of the above stretched film is obtained, for example, by allowing a polyvinyl alcohol-based film to be immersed into an aqueous solution of iodine for dyeing and subjected to stretching of this film to a length 3 times to 7 times as large as the original length. In producing the polarizers, the polyvinyl alcohol-based film may be immersed into an aqueous solution of potassium iodide optionally containing boric acid, zinc sulfate, zinc chloride, and the like. Further, in accordance with the needs, the polyvinyl alcohol-based film may be immersed into water for cleaning before the dyeing. By cleaning the polyvinyl alcohol-based film with water, the stain or the antiblocking agent on the polyvinyl alcohol-based film surface can be removed. Further, by cleaning the polyvinyl alcohol-based film with water, the polyvinyl alcohol-based film will swell, thereby exhibiting an effect of preventing non-uniformity such as unevenness in dyeing. Regarding the above stretching, the stretching treatment may be carried out after dyeing with iodine, or the stretching treatment may be carried out while dyeing, or the dyeing with iodine may be carried out after the stretching treatment, or the stretching treatment may be carried out in an aqueous solution of boric acid, potassium iodide, and the like.

The protective film provided with the polarizer is preferably a film being excellent in transparency, mechanical strength, thermal stability, shielding property against humidity, isotropy, and the like. The protective film is, for example, a polyester-based polymer such as polyethylene terephthalate and polyethylene naphthalate; cellulose-based polymer such as diacetylcellulose and triacetylcellulose; acrylic-based polymer such as polymethyl methacrylate; styrene-based polymer such as polystyrene and acrylonitrile-styrene copolymer (AS resin); polycarbonate-based polymer; polyolefin-based polymer such as polyethylene, polypropylene, polyolefin having a cyclo-based or norbornene structure, and ethylene-propylene copolymer; vinyl chloride-based polymer; amide-based polymer such as nylon and aromatic polyamide; imide-based polymer; sulfone-based polymer; polyethersulfone-based polymer; polyetheretherketone-based polymer; polyphenylene sulfide-based polymer; vinyl alcohol-based polymer; vinylidene chloride-based polymer; vinyl butyral-based polymer; allylate-based polymer; polyoxymethylene-based polymer; epoxy-based polymer; the blended product of these polymers described above; and the like. The protective film can also be formed with a cured layer of thermosetting type or ultraviolet setting type resin such as acrylic-based, urethane-based, acrylurethane-based, epoxy-based, and silicone-based.

Further, as the protective film, for example, a polymer film disclosed in Japanese Patent Application Laid-Open (JP-A) No. 2001-343529 can be used. The polymer film is, for example, a film of a resin composition containing, (A) a thermoplastic resin having a substituted and/or non-substituted imide group in a side chain and (B) a thermoplastic resin having a substituted and/or non-substituted phenyl group and nitrile group in a side chain. A specific example of this film is a film of a resin composition containing alternate copolymer of isobutylene, N-methylmaleimide and acrylonitrile-styrene copolymer. As the film, those made of a mixed extruded product of the resin compositions can be used.

The thickness of the protective film can be suitably determined. Generally, in view of the operability such as strength and handling property and the thin film property, the thickness of the protective film is from about 1 to 500 μm, and preferably from about 5 to 200 μm.

Also, the protective film is preferably colored to the least extent. This protective film excellent in transparency preferably has a retardation value (Rth) of from −90 nm to +75 nm in the thickness direction of the film for the visible light at 23° C. By using a film having a retardation value (Rth) of from −90 nm to +75 nm in the thickness direction, the coloring (optical coloring) of the polarizing plate due to the protective film can be almost completely eliminated. The retardation value (Rth) in the thickness direction is more preferably from −80 nm to +60 nm, and particularly preferably −70 nm to +45 nm.

Here, the retardation value (Rth) in the thickness direction is determined as Rth=(nx−nz)×d, where "nx" represents the refractive index of the slow axis direction within the plane surface of the film, "nz" represents the refractive index in the thickness direction of the film, and "d" represents the thickness [nm] of the film, respectively.

As the protective film, a cellulose-based polymer film such as triacetylcellulose is preferable in view of the polarization property and the durability. It is more preferable to use a polymer film containing triacetylcellulose as the protective film. Here, in the case of disposing a protective film on both sides of the polarizer, the protective films may be same polymer films or different polymer films.

The polarizer and the protective film are adhered generally through the water-based pressure-sensitive adhesive or the like. Examples of the water-based pressure-sensitive adhesive include isocyanate-based pressure-sensitive adhesives, polyvinyl alcohol-based pressure-sensitive adhesives, gelatin-based pressure-sensitive adhesives, vinyl-based pressure-sensitive adhesives, latex-based pressure-sensitive adhesives, water-based polyurethane pressure-sensitive adhesives, water-based polyester pressure-sensitive adhesives, and the like.

On the surface of the protective film on which the polarizer is not adhered, a hard coat layer may be provided, or various treatment such as antireflection treatment, antisticking treatment, or treatment intended for the purpose of diffusion or antiglaring may be subjected.

The hard coat layer is provided for the purpose of preventing damages to the polarizing plate surface and the like. The hard coat layer can be formed, for example, by adding a cured coating film onto the surface of the protective film. Examples of the coating film include cured films of ultraviolet setting type resin such as acrylic-based resin, and silicone-based resin. The antireflection treatment is carried out for the purpose of preventing reflection of external light on the polarizing plate surface. The antireflection layer can be formed by adding an antireflection film similar to conventional ones onto the protective film. Also, the antisticking treatment is carried out for the purpose of preventing close adhesion to adjacent layers of other members.

Also, the antiglaring treatment is carried out for the purpose of preventing the visibility hindrance of the light transmitted through the polarizing plate by reflection of external light on the surface of the polarizing plate. Examples of the antiglaring treatment include (a) means for surface roughening of the protective film by the sandblast method or the emboss treating method, (b) means for forming a protective film by blending transparent fine particles into the transparent resin, and the like. With use of these means, a fine bumpy structure can be formed on the surface of the protective film. Examples of the above transparent fine particles include inorganic fine particles (optionally having an electric conductivity in some cases) made of silica, alumina, titania, zirconia, tin oxide, indium oxide, cadmium oxide, antimony oxide, and the like having an average particle diameter of from 0.5 μm to 50 μm, organic fine particles (including beads) made of a cross-linking or non cross-linking polymer. In this case, the amount the transparent fine particles used is generally from about 2 to 50 parts by weight, preferably 5 to 25 parts by weight, based on 100 parts by weight of the transparent resin. The antiglaring treatment may also serve as a diffusing layer (viewing angle enlarging function and the like).

Here, the antireflection layer, the antisticking layer, the diffusing layer, the antiglaring layer, or the like may be provided on the protective film itself, and another optical layer provided with the antireflection layer or the like may be laminated on the protective film.

Next, the optical compensation layer will be described.

The optical compensation layer is made of a birefringent layer exhibiting a predetermined retardation, and is also called a retardation film.

The optical compensation layer may be an optical compensation layer for changing linearly polarized light to circularly polarized light, an optical compensation layer for changing circularly polarized light to linearly polarized light (the so-called ¼λ film), an optical compensation layer for changing the polarization direction of linearly polarized light (the so-called ½λ film), or the like. Also, Example of the optical compensation layer includes, (a) an optical compensation layer in which the refractive index (nz) in the thickness direction is smaller than the refractive index (nx, ny) in the plane (nx=ny>nz), (b) an optical compensation layer in which the refractive index (nz) in the thickness direction is larger than the refractive index (nx, ny) in the plane (nx=ny<nz), (c) other optically uniaxial optical compensation layers (nx>ny=nz), (d) optically biaxial optical compensation layers (nx>ny>nz, nx>nz>ny, or the like), or the like. Here, "nx", "ny" and "nz" respectively represents refractive index in an X axis, Y axis and Z axis. The "X axis" represents a direction in which the refractive index attains a maximum value in the plane, the "Y axis" represents a direction perpendicular to the X axis in the plane, and "Z axis" represents a thickness direction perpendicular to the X and Y axis.

Here, expression "nx=ny" includes not only a case where nx is completely equal to ny but also a case where nx is substantially equal to ny. The case where nx is substantially equal to ny is a case where Re [590] is, for example, from 0 to 10 nm, preferably from 0 to 5 nm. Re [590] is the in-plane retardation value at 23° C. and at a wavelength of 590 nm.

The material for forming the optical compensation layer is not particularly limited, so that a material conventionally known in the prior art may be adopted. It is preferably to select a material with which the birefringence index at the time of forming the optical compensation layer will be a relatively high value. Also, the optical compensation layer is preferably optically biaxial such as nx>ny>nz, because it can realize a wide view angle property. Also, the optical compensation layer preferably has an Nz coefficient (as determined by Nz=(nx−nz)/(nx−ny)) of from 2 to 20.

Examples of the material for forming the optical compensation layer include a birefringent film obtained by uniaxial or biaxial stretching of a non-liquid crystal polymer, an oriented film of a liquid crystal polymer, a film supporting an oriented layer of the liquid crystal polymer, and the like. The thickness of the optical compensation layer is also not particularly limited; however, the general thickness is form about 1 to 150 μm.

As the above non-liquid crystal polymer is, for example, polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyallylate, polysulfone, polyesters such as polyethylene terephthalate, polyether ketone, polyether sulfone, polyphenylene sulfide, polyphenylene oxide, polyallylsulfone, polyamideimide, polyesterimide, polyamide, polyimide, polyolefin, polyvinyl chloride, cellulose-based polymer, norbornene-based polymer, and the like. In addition, two dimensional or three dimensional various copolymers, graft copolymers, blended products of these may be included. These non-liquid crystal polymer is made into an oriented product (stretched film) by stretching or the like.

As the above liquid crystal polymer, for example, main chain type or side chain type liquid crystal polymer in which a conjugate linear atomic group (mesogenic) imparting a liquid crystal orientation is introduced into a main chain or a side chain of the polymer may be used. Examples of the liquid crystal polymer of main chain type include a polymer having a structure in which a mesogenic group is bonded to a spacer part that imparts a bending property and the like. Examples of the liquid crystal polymer of main chain type include a polyester-based liquid crystal polymer having a nematic orientation property, discotic polymer, cholesteric polymer, and the like. Examples of the liquid crystal polymer of side chain type include a liquid crystal polymer of having a polysiloxane, a polyacrylate, a polymethacrylate, or a polymalonate, as main chain and a mesogenic part made of para substituted cyclic compound units having a nematic orientation imparting property through a spacer part made of a conjugate atomic group as side chain. These liquid crystal polymers are prepared in a solution form. The liquid crystal polymer solution is, for example, developed onto an orientated substrate and subjected to heating treatment to be formed into a optical compensation layer having a prescribed retardation value. Examples of the above oriented substrate include an orientation-treated substrate in which the substrate of a thin film such as polyimide and polyvinyl alcohol formed on a glass plate is subjected to a rubbing treatment, an orientation-treated substrate having silicon oxide obliquely vapor-deposited, and the like.

The optical compensation layer is preferably formed with a non-liquid crystal polymer. Unlike a liquid crystal material, the non-liquid crystal polymer can form a film exhibiting an optically uniaxial property of nx>nz, or ny>nz by its own nature. For this reason, the substrate used in forming an optical compensation layer is not limited to an oriented substrate, so that a non-oriented substrate can be used as well. As compared with an oriented substrate, a non-oriented substrate can omit a process of coating an orientation film onto the surface, a process of laminating an orientation film, or the like. For this reason, the optical compensation layer is formed by coating a non-liquid crystal polymer onto the protective film laminated on the polarizer. Therefore, when the non-liquid crystal polymer is used, the optical compensation layer can be formed directly on the protective film without the use of a pressure-sensitive adhesive.

The weight-average molecular weight of the non-liquid crystal polymer is not particularly limited, and the weight-average molecular weight thereof is preferably from 1000 to 1000000, and more preferably from 2000 to 500000.

A preferred specific example of the non-liquid crystal polymer is polyimide, which has a high in-plane orientation property and is soluble in organic solvents. The optical compensation layer can be formed by dissolving the non-liquid crystal polymer into an appropriate solvent, coating this polymer solution onto an appropriate substrate such as a protective film, and then drying the resultant.

The solvent of the non-liquid crystal polymer solution is not particularly limited, and it can be appropriately determined in accordance with the kind of the non-liquid crystal polymer. Examples of the solvent include halogenated hydrocarbons such as chloroform and dichloromethane; phenols such as phenol; aromatic hydrocarbons such as benzene, toluene, and xylene; ketone-based solvents such as acetone, methyl ethyl ketone, methyl isobutyl ketone; ester-based solvents such as ethyl acetate and butyl acetate; alcohol-based solvents such as t-butyl alcohol and ethylene glycol; amide-based solvents such as dimethylformamide; nitrile-based solvents such as acetonitrile; ether-based solvents such as diethyl ether; ethyl cellosolve, butyl cellosolve; and the like. These solvents may be used alone or two or more kinds.

Various additives such as a stabilizer, a plasticizer, metals, or the like may be optionally blended with the polymer solution, wherein the non-liquid crystal polymer is dissolved in the solvent. The method for coating the polymer solution may be a method known in the prior art.

Further, in the case of using polyimide as the non-liquid crystal polymer, it is preferred to coat polyurethane or the like thinly on the coating surface of the substrate (for example, the protective film) in order to enhance adhesion between the substrate and the polymer.

A non-liquid crystal polymer such as polyimide exhibits an optical property satisfying nx=ny>nz, in the nature thereof, whether or not the substrate is oriented. Accordingly, the coated film containing the non-liquid crystal polymer exhibits an optical uniaxial property (that is, exhibits a retardation only in the thickness direction). Furthermore, when a substrate capable of contracting in an in-plane one direction is used as the substrate on which the non-liquid crystal polymer is to be coated, the coated film on the substrate also contracts in the in-plane direction in accordance with the contraction of the substrate. Accordingly, a refractive index difference is generated in the plane of the coated film so that an optical compensation layer exhibiting an optical biaxial property (nx>ny>nz) can be formed.

Specifically, in order to give contractility in an in-plane one direction to the substrate, the substrate is preferably subjected to stretching treatment in any in-plane one direction. When the substrate is beforehand stretched in this way, contraction force is generated in a direction reverse to the stretching direction.

In addition, the coated film on the substrate is subjected to heating treatment, thereby contracting the substrate. By use of this contraction difference of the substrate, a refractive index difference is given to the non-liquid crystal polymer, which forms the coated film. In other words, the coated film is contracted in accordance with the contraction of the substrate, so that an optical compensation layer having an optical biaxial property can be formed.

Conditions for the heating treatment are not particularly limited, and may be determined in accordance with the kind of the substrate material. The heating temperature is preferably from 25 to 300° C., more preferably from 50 to 200° C., and particularly preferably from 60 to 180° C.

It is also allowable to coat the polymer solution directly onto a substrate to form a coated film, and then to stretch a laminate composed of the substrate and the coated film. According to this method, an optical compensation layer exhibiting an optical biaxial property (nx>ny>nz) can be formed directly on the substrate from the same principle as described above.

The method for stretching the laminate composed of the substrate and the coating film is not particularly limited, and examples thereof include a tenter stretching method in the width direction of the substrate, a free-end longitudinal stretching method for stretching the substrate uniaxially in the longitudinal direction thereof, a fixed-end transverse stretching method for stretching the substrate uniaxially in the width direction in the state that the substrate is fixed in the longitudinal direction, a successive or simultaneous biaxial stretching for stretching the substrate in both of the longitudinal direction and the width direction, or the like.

Conditions for the stretching are not particularly limited, and may be appropriately determined in accordance with, for example, the kinds of the materials for forming the substrate and the coated film (optical compensation layer). Specifically, the stretch ratio is more than 1 and 5 or less, more preferably more than 1 and 4 or less, and particularly preferably more than 1 and 3 or less.

The retardation of the optical compensation layer may be set to be an appropriate value in accordance with a purpose for the use. For example, the retardation of the optical compensation layer is set to be an appropriate value in accordance with a purpose of compensating for coloration or viewing angle based on birefringence of the liquid crystal cell, or the like.

For the optical compensation layer, two or more kinds of optical compensation layers having different optical properties may be laminated onto each other in order to control the retardation thereof or the like.

The viewing angle compensation film is a film for making the viewing angle wide in order that even when a person views the screen of the liquid crystal display apparatus in an oblique direction, he/she can watch images thereon vividly. This viewing angle compensation film may be an optical compensation layer. Examples of the viewing angle compensation film (optical compensation layer) include a birefringent polymer film biaxially-stretched in an in-plane direction, a polymer film having a refractive index controlled in the thickness direction, and two-direction stretched films such as a tilted oriented film. Examples of the tilted oriented film include a film obtained by adhering a thermally contractive film onto a polymer film, and then stretching (or contracting) the polymer film while thermal contraction force is caused to act thereto, and a film obtained by orientating a liquid crystal polymer obliquely.

An optical film wherein a polarizing plate and a brightness enhancement film are adhered onto each other is usually provided on the side reverse to the viewing side surface (backlight side) of the liquid crystal cell. The brightness enhancement film has a property that when natural light is entered into the film by reflection on the backlight or the like, a linearly polarized light having a predetermined polarizing axis or a circularly polarized light in a predetermined direction is reflected on the film while other light transmits the film.

Examples of the brightness enhancement film include a multi-layered thin film made of a dielectric, a multi-layered laminate composed of thin films different from each other in refractive index anisotropy, an oriented film made of a cholesteric liquid crystal polymer, and a film wherein the oriented polymer is supported on a substrate.

<Liquid Crystal Display Apparatus>

The liquid crystal panel of the present invention is usually integrated into a liquid crystal display apparatus. The liquid crystal display apparatus is formed in accordance with a method in the prior art. Specifically, the liquid crystal display apparatus is generally formed by assembling a liquid crystal panel wherein the above optical film is adhered onto a liquid crystal cell through the above pressure-sensitive adhesive layer, components for constituting such as an illumination system, and the like. The liquid crystal display apparatus of the present invention is not particularly limited except a matter that the above liquid crystal panel is used. The liquid crystal panel (liquid crystal cell) may be used in any mode such as a VA mode, an IPS mode, a TN mode, an STN mode, or a π mode.

The liquid crystal display apparatus of the present invention is used for arbitrary application. The use thereof is directed, for example, to OA appliance such as personal computer monitors, notebook personal computers, and copying machines; portable appliance such as portable phones, watches, digital cameras, portable information terminals (PDA), and portable game machines; electric appliance for home use such as video cameras, television sets, and electronic ranges; appliance for mounting on a vehicle such as back monitors, monitors for a car navigation system, and car audio apparatus; display apparatus appliance such as monitors for information for commercial stores; safeguard appliance such as supervising monitors; assisting or medical appliance such as monitors for assisting and caring seniors, monitors for medical use, or the like appliance.

An application wherein the liquid crystal display apparatus of the present invention is used is preferably a television. The screen size of the television is preferably a wide-17 size (373 mm×224 mm) or more, more preferably a wide-23 size (499 mm×300 mm) or more, and particularly preferably wide-32 size (687 mm×412 mm) or more.

EXAMPLES

Examples of the present invention will be specifically described hereinafter. However, the present invention is not limited to the Examples. In the Examples, "part(s)" and "%" refer to "part(s) by weight" and "% by weight", respectively.
(Formation of Polarizers)

A polyvinyl alcohol film having a thickness of 80 μm was stretched 3 times in a 0.3%-concentration solution of iodine in water (30° C.) between rolls different in speed ratio. Next, the film was stretched into a total stretch ratio of 6 times in an aqueous solution (60° C.) containing boric acid at a concentration of 4% and potassium iodine at a concentration of 10%. Next, the film was washed by immersing in a 1.5%-concentration solution of potassium iodine in water (30° C.) for 10 seconds, and then dried at 50° C. for 4 minutes. In this way, polarizers were formed.

(Formation of a Polarizing Plate (1))

A saponified triacetylcellulose film (TAC film) having a thickness of 80 μm was adhered onto each of the two surfaces of the polarizers through a polyvinyl alcohol-based pressure-sensitive adhesive (0.5 μm), so as to form a polarizing plate made of the TAC film—the polarizer—the TAC film.

(Formation of a Polarizing Plate (2))

A solution (solid content concentration: 15%) wherein a polyimide, synthesized from 2,2'-bis(3,4-dicarboxyphenyl) hexafluoropropane and 2,2'-bis(trifluoromethyl)-4,4'-diaminobiphenyl was dissolved in methyl isobutyl ketone (solvent), was coated onto a triacetylcellulose film (TAC film) having a thickness of 40 μm (coating thickness: 20 μm). Thereafter, the resultant was dried at 100° C. for 10 minutes to yield a polyimide thin film having a thickness of about 2.5 μm. Next, the film was subjected to stretching treatment by stretching the film longitudinally 1.05 times at 150° C. In this way, an optical compensation layer was formed.

The TAC film, on which this optical compensation layer was laminated, was adhered onto the polarizers through the polyvinyl alcohol-based pressure-sensitive adhesive (0.5 μm). At the time of the adhesion, the optical compensation layer and the polarizer were arranged to make the slow axis direction of the optical compensation layer parallel to the absorption axis direction of the polarizer. Furthermore, a triacetylcellulose film having a thickness of 40 μm was adhered onto the reverse surface (surface on which no optical compensation layer was laminated) of this polarizer through the polyvinyl alcohol-based pressure-sensitive adhesive (0.5 μm). In this way, a polarizing plate (2) was formed which was made of the optical compensation layer of the polyimide—the TAC film—the polarizer—the TAC film.

(Measurement of the Creep Value)

A film cut into a size of 10 mm×50 mm was adhered onto a glass plate (trade name: EAGLE 2000, manufactured by Corning Inc.) through a pressure-sensitive adhesive which was an object to be measured. This was allowed to stand still in an autoclave having a temperature of 50° C. and 5 atmospheric pressures for 30 minutes. However, the thickness of the pressure-sensitive adhesive was set to be 20 μm as the dry thickness thereof. The area where the film and the glass plate were adhered to each other was set to be 10 mm².

Figure 5A:
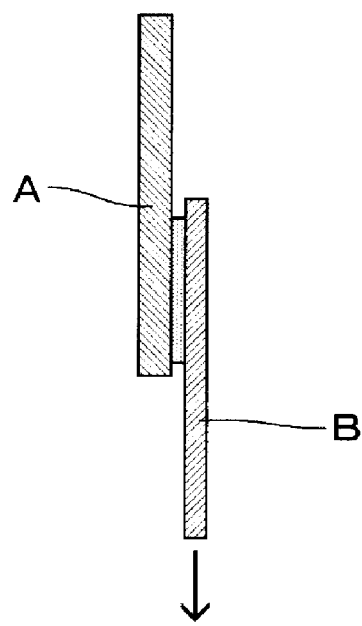
FIGS. 5A and 5B are sectional reference view illustrating a method for measuring a creep value.
Figure 5B:
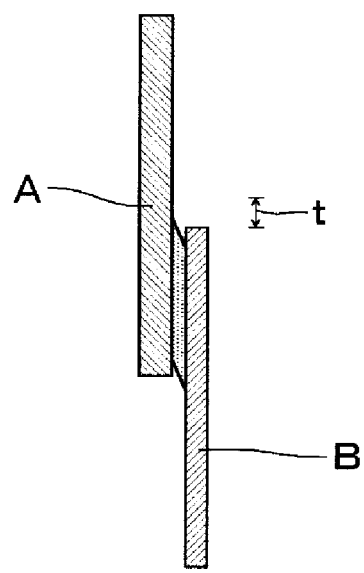

Thereafter, as illustrated in FIG. 5A, a glass plate A was fixed, and a load of 4.9 N (600 gf) was applied perpendicularly to a film B at 23° C. After one hour therefrom, the shift amount t (the shift amount t after one hour=the initial adhesion position−the adhesion position after one hour) of the film was measured (FIG. 5B).

(Preparation of a Pressure-Sensitive Adhesive (1))

Into a reaction vessel equipped with a condenser tube, a nitrogen-introducing tube, a thermometer, and a stirrer were charged 100 parts of n-butyl acrylate, 5 parts of acrylic acid, and 0.1 parts of 2-hydroxyethyl acrylate together with ethyl acetate. The mixture was reacted under a nitrogen gas flow at 60° C. for 4 hours. Thereafter, ethyl acetate was added to the reaction solution to yield a solution containing an acrylic-based polymer having a weight-average molecular weight of 2100000 (solid content concentration: 30%).

Tolylenediisocyanate (trade name: CORONATE L, manufactured by Nippon Polyurethane Industry Co., Ltd.) was incorporated into the acrylic-based polymer solution in an amount of 1 part based on 100 parts of the solid in the solution to yield an acrylic-based pressure-sensitive adhesive (1).

The creep value of this pressure-sensitive adhesive (1) was measured in accordance with the above method. As a result, the value was 30 μm.

(Preparation of a Pressure-Sensitive Adhesive (2))

An acrylic-based pressure-sensitive adhesive (2) was yielded in the same way as in the preparation of the above pressure-sensitive adhesive (1) except that the amount of tolylenediisocyanate was changed to 0.6 parts.

The creep value of this pressure-sensitive adhesive (2) was measured. As a result, the value was 70 μm.

(Preparation of a Pressure-Sensitive Adhesive (3))

An acrylic-based pressure-sensitive adhesive (3) was yielded in the same way as in the preparation of the above pressure-sensitive adhesive (1) except that the amount of tolylenediisocyanate was changed to 0.05 parts.

The creep value of this pressure-sensitive adhesive (3) was measured. As a result, the value was 150 μm.

(Preparation of a Pressure-Sensitive Adhesive (4))

An acrylic-based pressure-sensitive adhesive (4) was yielded in the same way as in the preparation of the above pressure-sensitive adhesive (1) except that the amount of tolylenediisocyanate was changed to 3 parts.

The creep value of this pressure-sensitive adhesive (4) was measured. As a result, the value was 5 μm.

(Preparation of a Pressure-Sensitive Adhesive (5))

Into a reaction vessel was charged 99 parts of n-butyl acrylate, and 1 part of 4-hydroxybutyl acrylate together with ethyl acetate. The mixture was reacted under a nitrogen gas flow at 60° C. for 4 hours. Thereafter, ethyl acetate was added to the reaction solution to yield a solution containing an acrylic-based polymer having a weight-average molecular weight of 1650000 (solid content concentration: 30%).

Trimethylolpropanexylenediisocyanate (trade name: TAKENATE D110N, manufactured by Mitsui Takeda Chemicals, Inc.) and benzoyl peroxide were incorporated into the acrylic-based polymer solution in amounts of 0.02 parts and 0.3 parts, respectively, based on 100 parts of the solid in the solution to yield an acrylic-based pressure-sensitive adhesive (5).

The creep value of this pressure-sensitive adhesive (5) was measured. As a result, the value was 200 μm.

(Preparation of a Pressure-Sensitive Adhesive (6))

An acrylic-based pressure-sensitive adhesive (6) was yielded in the same way as in the preparation of the above pressure-sensitive adhesive (5) except that the amount of trimethylolpropanexylenediisocyanate was changed to 0.16 parts.

The creep value of this pressure-sensitive adhesive (6) was measured. As a result, the value was 70 μm.

(Preparation of a Pressure-Sensitive Adhesive (7))

Into a reaction vessel was charged 99 parts of iso-octyl (meth)acrylate, and 1 part of 6-hydroxyhexyl acrylate together with ethyl acetate. The mixture was reacted under a nitrogen gas flow at 60° C. for 4 hours. Thereafter, ethyl acetate was added to the reaction solution to yield a solution containing an acrylic-based polymer having a weight-average molecular weight of 1600000 (solid concentration: 30%).

Trimethylolpropanexylenediisocyanate (trade name: TAKENATE D110N, manufactured by Mitsui Takeda Chemicals, Inc.) was incorporated into the acrylic polymer solution in an amount of 0.1 parts based on 100 parts of the solid in the solution to yield an acrylic-based pressure-sensitive adhesive (7).

The creep value of this pressure-sensitive adhesive (7) was measured. As a result, the value was 500 μm.

(Preparation of a Pressure-Sensitive Adhesive (8))

An acrylic-based pressure-sensitive adhesive (8) was yielded in the same way as in the preparation of the above pressure-sensitive adhesive (7) except that the amount of trimethylolpropanexylenediisocyanate was changed to 0.03 parts.

The creep value of this pressure-sensitive adhesive (8) was measured. As a result, the value was 2500 μm.

(Preparation of a Pressure-Sensitive Adhesive (9))

An acrylic-based pressure-sensitive adhesive (9) was yielded in the same way as in the preparation of the above pressure-sensitive adhesive (7) except that the amount of trimethylolpropanexylenediisocyanate was changed to 0.01 parts.

The creep value of this pressure-sensitive adhesive (9) was measured. As a result, the value was 3500 μm.

Here, the compositions and the creep values of the pressure-sensitive adhesives (1) to (9) are shown in Table 1.

TABLE 1

| | Composition | | | Creep value (μm) |
|---|---|---|---|---|
| | Acrylic-based polymer | Isocyanate | BPO | |
| Pressure-sensitive adhesive (1) | 100 | 1 | | 30 |
| Pressure-sensitive adhesive (2) | 100 | 0.6 | | 70 |
| Pressure-sensitive adhesive (3) | 100 | 0.05 | | 150 |
| Pressure-sensitive adhesive (4) | 100 | 3 | | 5 |
| Pressure-sensitive adhesive (5) | 100 | 0.02 | 0.3 | 200 |
| Pressure-sensitive adhesive (6) | 100 | 0.16 | 0.3 | 70 |
| Pressure-sensitive adhesive (7) | 100 | 0.1 | | 500 |
| Pressure-sensitive adhesive (8) | 100 | 0.03 | | 2500 |
| Pressure-sensitive adhesive (9) | 100 | 0.01 | | 3500 |

Example 1

The pressure-sensitive adhesive (5) was coated (a dry thickness of 20 μm) onto a surface of the protective film of the polarizing plate (1), and then the resultant was adhered onto a viewing side surface of a liquid crystal cell (trade name: AQUOS, manufactured by Sharp Corp.) in a VA mode for a 37-inch screen (461 mm in vertical and 819 mm in lateral). Separately, the pressure-sensitive adhesive (2) was coated (a dry thickness of 20 μm) onto a surface of the optical compensation layer of the polarizing plate (2), and then the resultant was adhered onto the surface reverse to the viewing side surface of the above liquid crystal cell to produce a liquid crystal panel. However, the polarizing plate (1) was adhered to make the absorption axis direction of its polarizer parallel to long side of the liquid crystal cell. The polarizing plate (2) was adhered to make the absorption axis direction of its polarizer parallel to short side of the liquid crystal cell.

Example 2

A liquid crystal panel was produced in the same way as in Example 1 except that the pressure-sensitive adhesive (7) was used for the adhesion of the polarizing plate (1), and the pressure-sensitive adhesive (2) was used for the adhesion of the polarizing plate (2).

Example 3

A liquid crystal panel was produced in the same way as in Example 1 except that the pressure-sensitive adhesive (8) was used for the adhesion of the polarizing plate (1), and the pressure-sensitive adhesive (3) was used for the adhesion of the polarizing plate (2).

Example 4

A liquid crystal panel was produced in the same way as in Example 1 except that the pressure-sensitive adhesive (6) was used for the adhesion of the polarizing plate (1), and the pressure-sensitive adhesive (1) was used for the adhesion of the polarizing plate (2).

Example 5

A liquid crystal panel was produced in the same way as in Example 1 except that the pressure-sensitive adhesive (5) was used for the adhesion of the polarizing plate (1); the pressure-sensitive adhesive (2) was used for the adhesion of the polarizing plate (2); the absorption axis direction of the polarizer of the polarizing plate (1) was arranged at an angle of 45 degrees to the long side of the liquid crystal cell; and the absorption axis direction of the polarizer of the polarizing plate (2) was arranged perpendicularly to the absorption axis direction of the polarizing plate (1).

Comparative Example 1

A liquid crystal panel was produced in the same way as in Example 1 except that the pressure-sensitive adhesive (2) was used for the adhesion of the polarizing plate (1), and the pressure-sensitive adhesive (5) was used for the adhesion of the polarizing plate (2).

Comparative Example 2

A liquid crystal panel was produced in the same way as in Example 1 except that the pressure-sensitive adhesive (9) was used for the adhesion of the polarizing plate (1), and the pressure-sensitive adhesive (2) was used for the adhesion of the polarizing plate (2).

Comparative Example 3

A liquid crystal panel was produced in the same way as in Example 1 except that the pressure-sensitive adhesive (5) was used for the adhesion of the polarizing plate (1), and the pressure-sensitive adhesive (4) was used for the adhesion of the polarizing plate (2).

Table 2 shows the kind of the pressure-sensitive adhesives used in Examples 1 to 5 and Comparative Examples 1 to 3, the ratio between the creep values (L1/L2), and the arrangement of the polarizers.

TABLE 2

| | Pressure-sensitive adhesive on viewing side | | Pressure-sensitive adhesive on reverse side | | Ratio between creep values (L1/L2) | Absorption axis direction of viewing side polarizer | Absorption axis direction of reverse side polarizer |
|---|---|---|---|---|---|---|---|
| | Kind | Creep value (L1) | Kind | Creep value (L2) | | | |
| Example 1 | Pressure-sensitive adhesive (5) | 200 | Pressure-sensitive adhesive (2) | 70 | 2.86 | Parallel to long side | Parallel to short side |
| Example 2 | Pressure-sensitive adhesive (7) | 500 | Pressure-sensitive adhesive (2) | 70 | 7.14 | Parallel to long side | Parallel to short side |
| Example 3 | Pressure-sensitive adhesive (8) | 2500 | Pressure-sensitive adhesive (3) | 150 | 16.67 | Parallel to long side | Parallel to short side |
| Example 4 | Pressure-sensitive adhesive (6) | 70 | Pressure-sensitive adhesive (1) | 30 | 2.33 | Parallel to long side | Parallel to short side |
| Example 5 | Pressure-sensitive adhesive (5) | 200 | Pressure-sensitive adhesive (2) | 70 | 2.86 | Angle of 45 degrees to long side | Angle of 135 degrees to long side |
| Comparative Example 1 | Pressure-sensitive adhesive (2) | 70 | Pressure-sensitive adhesive (5) | 200 | 0.35 | Parallel to long side | Parallel to short side |
| Comparative Example 2 | Pressure-sensitive adhesive (9) | 3500 | Pressure-sensitive adhesive (2) | 70 | 50.0 | Parallel to long side | Parallel to short side |
| Comparative Example 3 | Pressure-sensitive adhesive (5) | 200 | Pressure-sensitive adhesive (4) | 5 | 40.0 | Parallel to long side | Parallel to short side |

(Light Leakage Test)

The liquid crystal panels of Examples 1 to 5 and Comparative Examples 1 to 3 were each exposed to an environment wherein a change in temperature was remarkable. About the temperature change, the liquid crystal panel was allowed to stand still in an environment of −30° C. for 30 minutes, and immediately thereafter the panel was shifted to an environment of 70° C. and then allowed to stand still therein for 30 minutes. This was defined as one cycle, and this cycle was repeated 100 times.

Thereafter, black luminance of the liquid crystal panels of Examples 1 to 5 and Comparative Examples 1 to 3 was measured in a black display state. The measurement was made in a dark room. The black luminance was measured with a measuring device (trade name: CA-1500, manufactured by Minolta Co., Ltd.) at a position 1 m apart from the liquid crystal panel.

After the measurement, at intervals of 5 mm of the liquid crystal panel, the luminance was extracted. The average of the luminance in areas 3 cm square at the upper left corner, the center of the left edge, the lower left corner and the center was calculated. The results are shown in Table 3.

However, about the liquid crystal panel of Comparative Example 2, bubbles were generated in the acrylic-based pressure-sensitive adhesive (9) between the polarizing plate (1) and the liquid crystal cell. As a result, the luminance was unable to be measured. About Comparative Example 3, the acrylic-based pressure-sensitive adhesive (4) between the polarizing plate (2) and the liquid crystal cell was broken so that the polarizing plate (2) was peeled off. As a result, the luminance was unable to be measured.

TABLE 3

| | Light leakage test | | | |
|---|---|---|---|---|
| | Upper left corner | Lower left corner | Center of left edge | Center |
| Example 1 | 0.28 | 0.29 | 0.27 | 0.27 |
| Example 2 | 0.28 | 0.28 | 0.27 | 0.27 |
| Example 3 | 0.27 | 0.28 | 0.27 | 0.27 |
| Example 4 | 0.29 | 0.29 | 0.27 | 0.27 |

TABLE 3-continued

| | Light leakage test | | | |
|---|---|---|---|---|
| | Upper left corner | Lower left corner | Center of left edge | Center |
| Example 5 | 0.30 | 0.29 | 0.35 | 0.28 |
| Comparative Example 1 | 0.56 | 0.40 | 0.31 | 0.30 |
| Comparative Example 2 | Unable to be measured by bubbles generated in viewing side pressure-sensitive adhesive | | | |
| Comparative Example 3 | Unable to be measured by peeling off of reverse side polarizer | | | |

It was proved that in Examples 1 to 5, the black luminance was excellent and light leakage was slight. In particular, in Examples 1 to 4, this advantageous effect was excellent.

On the other hand, in Comparative Example 1, the black luminance was poor in the corners. In Comparative Example 2, the pressure-sensitive adhesive on the viewing side was too soft so that bubbles were generated. In Comparative Example 3, the pressure-sensitive adhesive on the reverse side was too hard so that the pressure-sensitive adhesive was unable to correspond with the contraction of the polarizing plate. As a result, the pressure-sensitive adhesive layer was broken.

What is claimed is:

1. A liquid crystal panel, comprising
a first optical film adhered to a viewing side of a liquid crystal cell through a first pressure-sensitive adhesive layer,
wherein the first optical film is adhered in direct contact with the first pressure-sensitive adhesive layer and the first pressure-sensitive adhesive layer is adhered in direct contact with the liquid crystal cell on the viewing side of the liquid crystal cell,
a second optical film adhered to the reverse side of the liquid crystal cell through a second pressure-sensitive adhesive layer,
wherein the second optical film is adhered in direct contact with the second pressure-sensitive adhesive layer and the second pressure-sensitive adhesive layer is adhered in direct contact with the liquid crystal cell on the reverse side of the liquid crystal cell, wherein a creep value (L1) of the first pressure-sensitive adhesive layer is from 50 to 3000 μm, a creep value (L2) of the second pressure-sensitive adhesive layer is from 10 to 400 μm, and the creep value (L1) of the first pressure-sensitive adhesive layer is larger than the creep value (L2) of the second pressure-sensitive adhesive layer, wherein the first and second optical films are each a polarizing plate comprising a polarizer, an absorption axis direction of the polarizer of the first optical film is arranged in substantially parallel to a long side of the liquid crystal panel, and an absorption axis direction of the polarizer of the second optical film is arranged in substantially parallel to a short side of the liquid crystal panel, provided that the creep value is the shift amount after one hour of the pressure-sensitive adhesive layer having a thickness of 20 μm in a case where a tensile shearing force of 4.9 N is applied to an adhesive area of 10 mm$^2$ at 23° C.

2. The liquid crystal panel according to claim 1, wherein the polarizer comprises a stretched film, and the absorption axis of the polarizer is generated in a main stretching direction of the stretched film.

3. The liquid crystal panel according to claim 1, wherein the ratio of the creep value (L1) of the first pressure-sensitive adhesive layer to the creep value (L2) of the second pressure-sensitive adhesive layer (L1/L2) is 30 or less.

4. The liquid crystal panel according to claim 3, wherein the ratio of the creep value (L1) of the first pressure-sensitive adhesive layer to the creep value (L2) of the second pressure-sensitive adhesive layer (L1/L2) is 2 or more.

5. The liquid crystal panel according to claim 3, wherein the ratio of the creep value (L1) of the first pressure-sensitive adhesive layer to the creep value (L2) of the second pressure-sensitive adhesive layer (L1/L2) is from 5 to 20.

6. The liquid crystal panel according to claim 1, a circumference of which has a bezel.

7. The liquid crystal panel according to claim 1, wherein the first and second pressure-sensitive adhesive layers are each made mainly of an acrylic-based pressure-sensitive adhesive.

8. A liquid crystal display apparatus comprising a liquid crystal panel according to claim 1.

* * * * *